Patented Mar. 20, 1945

2,371,943

UNITED STATES PATENT OFFICE 2,371,943

RESINS OBTAINED FROM A POLYVINYL ACETAL AND SECONDARY DIARYL AMINES

Paul R. Austin, Wilmington, Del., assignor to E. I. du Pont de Nemours & Company, Wilmington, Del., a corporation of Delaware No Drawing. Application April 1, 1941, Serial No. 386,370

2 Claims. (Cl. 260—73)

This invention relates to compositions of matter and more particularly to improved resinous compositions.

The polyvinyl acetals are known to be useful for many purposes but their utility is limited by their tendency to become brittle upon aging and upon exposure to heat. Polyvinyl formal, for example, possesses excellent toughness, abrasion resistance, and excellent dielectric properties which recommend it as an electrical insulating material. Polyvinyl formal, however, tends to embrittle rapidly at the temperatures at which electrical equipment is frequently operated. A number of agents have been proposed to correct this condition but none of these have been sufficiently effective to make the polyvinyl formals suitable for all insulating purposes.

This invention has as an object the production of new and useful resinous compositions. A further object is the preparation of improved polyvinyl acetal resin compositions. Other objects will appear hereinafter.

The above objects are accomplished by incorporating with the polyvinyl acetal a secondary diaryl amine in which oxygen or sulfur is attached to at least one of the aromatic nuclei in the position ortho or para to the aminonitrogen atom.

I have found that polyvinyl acetals containing a small amount of a diaryl amine of the type mentioned above are improved in resistance to embrittlement on aging and that this desirable effect is particularly pronounced at the higher temperatures which cause rapid deterioration in these resins when used alone.

A compound illustrative of this type of diaryl amine is $C_6H_5.NH.C_6H_4.O.CH_2.COOH$ in which the aminonitrogen is positioned either ortho or para to the oxygen attached to the benzene ring. The elements oxygen or sulfur, which may be referred to collectively as elements of group VI of the periodic table having atomic weights less than 33, can form with the aminonitrogen atom a part of a heterocyclic ring. An example of a compound of this type is phenothiazine.

When the improved resinous composition of this invention is to be applied or cast from a solution, the agent is conveniently dissolved in the solvent or added to the solution. Evaporation of the solvent then leaves a homogeneous, stabilized polyvinyl acetal structure. The agent can also be mechanically blended with the polyvinyl acetal in a mixer or upon heated rolls. When a plasticizer is to be milled into the resin, the agent can be added in the same operation.

The following examples, in which the parts are by weight, further illustrate the practice of this invention.

Example I

A solution is prepared by agitating together 100 parts polyvinyl formal, 900 parts dioxane, and 3 parts of p-N-phenylaminophenoxyacetic acid. A film is cast from this solution by spreading on a flat surface, and allowing to dry for 24 hours at room temperature. The film is then stripped from the surface and aged at room temperature for 96 hours before testing. A sample of this film is exposed to air in an oven at 150° C. Portions of the film are removed periodically and tested for embrittlement by subjecting a fold of the film to a standard impact. The stabilized film does not fail in 74 hours but does fail in 82 hours. A similar film containing no stabilizer fails badly after only six hours of exposure.

Example II

A film is cast from a solution containing 100 parts of polyvinyl formal, 900 parts dioxane, and 3 parts p-phenetylaminophenoxyacetic acid as described in Example I. A sample of this film and a control film of the unmodified resin are exposed at 150° C. and tested for failure by the method described in Example I. The stabilized film shows no failure at 78 hours and does not show complete failure until 99 hours. The unmodified film fails after six hours.

Example III

Two solutions, the first containing 95 parts polyvinyl formal, 900 parts dioxane, and 5 parts phenothiazine, and the second containing 99 parts polyvinyl formal, 900 parts dioxane, and 1 part phenothiazine, are prepared. Films are cast from these solutions as described in Example I. The films are exposed to air at 150° C. in closed containers and examined periodically for failure as in Example I.

The resin containing five parts of the agent shows no failure at 95 hours and that containing one part of the agent does not fail at 63 hours. The time for complete failure of the composition containing the five parts of phenothiazine is 119 hours and that containing one part is 71 hours. The film containing no agent fails at 8 hours.

The polyvinyl acetals improved by the practice of this invention include such compounds as polyvinyl butyral, polyvinyl acetal, polyvinyl formal, and the polyvinyl ketals. The invention is of particular importance with polyvinyl formal because the higher softening point of the resin permits its use at higher temperatures where embrittlement becomes a serious problem.

The stabilizing agents which can be used include those of the general structure ANHA'XY, where A and A' are arylene groups, X is oxygen or a divalent sulfur atom, and Y is a monovalent organic radical, the substituent XY being oriented ortho or para to the aminonitrogen atom. Examples of these compounds in addition to those mentioned are p-naphthylaminophenoxyacetic acid, p-phenethylaminophenoxyacetic acid, imino-p-p'-diphenoxyacetic acid, and p-phenylaminoanisol. Other compounds within the statement of invention previously given consisting of secondary diaryl amines in which oxygen or sulfur is attached to at least one of the aromatic nuclei in the position ortho or para to the aminonitrogen atom are phenothiazine and phenoxazine. Stabilizing agents in which the group Y contains an acid function, such as the first three compounds listed above, are particularly valuable since the acid group reduces the volatility of the stabilizer and apparently permits it to become chemically attached to the polyvinyl acetal molecule.

The method of incorporating the stabilizing agent is dependent upon the use and method of application of the polymer. The agent is usually most conveniently dissolved in a solution of the polymer if it is to be used as a coating composition or for the preparation of solvent cast films, filaments, etc. The stabilizing agent can also be incorporated by mechanical mixing with the polymer in a mixer or upon hot rolls. This method is particularly useful when a plasticizer is to be milled into the polyvinyl acetal. The stabilizing agent can also be incorporated into the polymer by impregnation from a solution of the stabilizing agent. Although this method is useful for the stabilization of chip or granular polymer to be formed in molding or extrusion equipment, it can also be used for stabilization of finished polyvinyl formal articles. In cases in which the stabilizer does not interfere in the preparation of the polymer, the stabilizing agent can be added during the preparation of the polyvinyl acetal.

The amount of stabilizing agent used depends upon the properties of the particular compound being used, but in general an amount varying from about 0.10% to about 10% is used. Usually it is preferred to use from about 0.5% and 5% of the agent.

The polyvinyl acetals stabilized by the method of this invention are particularly valuable as insulation coatings on wire. Ordinarily polyvinyl acetal coated wire possesses a high degree of resistance to damage by abrasion, flexing, and stretching, but these desirable properties are in a large measure lost by exposure, especially at the high temperatures often encountered in electrical machines such as motors and generators. After embrittlement, the coating may be broken by vibration or by rubbing of one wire against another with consequent loss in the insulating value of the coating. Wires coated with polyvinyl acetals which have been stabilized by the method of this invention retain their resistance to mechanical damage, even after long exposure to high temperatures. The stabilized wire coatings are also more resistant to degradation at ordinary temperatures than the unstabilized coatings, although the effect is not so noticeable as at higher temperatures.

The polyvinyl acetals stabilized according to this invention are useful as protective finishes for surfaces of all kinds where freedom from embrittlement after prolonged exposure at ordinary and at elevated temperatures is a primary requisite. They are also useful in the preparation of unsupported films and filaments. Sheetings and fabrics coated with the stabilized polyvinyl acetals of this invention are useful in the manufacture of shoes, upholstery, shower curtains, belts, etc. The stabilized polyvinyl acetals are also useful in the manufacture of safety glass and as adhesives, as, for example, in the manufacture of plywood.

As many apparently widely different embodiments of this invention may be made without departing from the spirit and scope thereof, it is to be understood that it is not limited to the specific embodiments thereof except as defined in the appended claims.

I claim:
1. A composition of matter comprising a polyvinyl acetal and a secondary diarylamine selected from the class consisting of (a), diarylamines in which an element of the group consisting of oxygen and bivalent sulfur is attached by a single bond to one, and only one, of the aromatic radicals in one of the two positions consisting of the two positions orth and para to the aminonitrogen, the other valence of said element being satisfied by one of the groups consisting of carboxylalkyl and alkyl groups, and (b) secondary diarylamines in which said element joins the two aromatic nuclei at positions ortho to the aminonitrogen.

2. The composition set forth in claim 1 in which said secondary diarylamine is present in amount of from 0.5% to 5%.

PAUL R. AUSTIN.